US008622367B2

(12) United States Patent
Lovell et al.

(10) Patent No.: US 8,622,367 B2
(45) Date of Patent: Jan. 7, 2014

(54) LOW FRICTION LIVE-LOADED PACKING

(75) Inventors: Michel Ken Lovell, Marshalltown, IA (US); Ted Dennis Grabau, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days.

(21) Appl. No.: 13/106,621

(22) Filed: May 12, 2011

(65) Prior Publication Data

US 2011/0209777 A1 Sep. 1, 2011

Related U.S. Application Data

(62) Division of application No. 11/841,423, filed on Aug. 20, 2007, now Pat. No. 7,963,502.

(60) Provisional application No. 60/840,369, filed on Aug. 25, 2006.

(51) Int. Cl.
*F16K 31/44* (2006.01)

(52) U.S. Cl.
USPC ............ 251/214; 277/510; 277/520; 277/521

(58) Field of Classification Search
USPC ........... 251/214; 277/510, 520, 522, 525, 526
See application file for complete search history.

(56) References Cited

U.S. PATENT DOCUMENTS

| 343,003 | A | * | 6/1886 | Brownell | 277/520 |
|---|---|---|---|---|---|
| 458,453 | A | * | 8/1891 | Goodrich | 277/511 |
| 490,107 | A | | 1/1893 | Ferguson | |
| 502,252 | A | | 7/1893 | Hanna | |
| 877,706 | A | | 1/1908 | Duffy | |
| 1,502,734 | A | | 7/1924 | Martin | |
| 1,576,376 | A | | 3/1926 | Sudekum | |
| 1,643,971 | A | | 10/1927 | Wishart | |
| 1,914,741 | A | * | 6/1933 | Gysling | 277/605 |
| 2,049,774 | A | * | 8/1936 | Hoffman | 277/500 |
| 2,160,536 | A | * | 5/1939 | Buning | 251/214 |

(Continued)

FOREIGN PATENT DOCUMENTS

| CN | 1231683 A | 10/1999 |
|---|---|---|
| CN | 1748104 A | 3/2006 |

(Continued)

OTHER PUBLICATIONS

Chinese Office Action Application No. 200780030762.4, dated Apr. 13, 2010.

(Continued)

*Primary Examiner* — John K Fristoe, Jr.
*Assistant Examiner* — Marina Tietjen
(74) *Attorney, Agent, or Firm* — Marshall, Gerstein & Borun LLP; Michael P. Furmanek

(57) ABSTRACT

A valve packing assembly for a control valve includes a seal assembly, a loading assembly, and a packing retainer. The seal assembly has a seal component to provide a fluid seal around a valve stem and an anti-extrusion component to substantially prevent extrusion of the seal component about the valve stem. The loading assembly is configured to advantageously provide a predetermined packing stress to the seal assembly that is in the same direction as a process stress applied to the seal assembly by a process fluid, thereby substantially reducing packing friction and packing wear in the control valve assembly.

16 Claims, 4 Drawing Sheets

(56) References Cited

U.S. PATENT DOCUMENTS

| | | | |
|---|---|---|---|
| 2,567,527 A | | 9/1951 | Parks |
| 2,765,185 A | | 10/1956 | Mott |
| 3,467,357 A | | 9/1969 | Schomer et al. |
| 3,559,951 A | | 2/1971 | Whiteman, Jr. |
| 4,289,317 A | * | 9/1981 | Kuc ............................ 277/308 |
| 4,340,204 A | | 7/1982 | Herd |
| 4,451,047 A | | 5/1984 | Herd et al. |
| 4,556,076 A | | 12/1985 | Bridges |
| 4,576,385 A | | 3/1986 | Ungchusri et al. |
| 4,601,304 A | * | 7/1986 | Schobl ..................... 137/315.27 |
| 4,630,636 A | * | 12/1986 | Cutcher ................... 137/315.28 |
| 4,640,305 A | * | 2/1987 | Johnson ........................ 137/312 |
| 4,827,967 A | * | 5/1989 | Junier ........................... 137/240 |
| 4,840,379 A | | 6/1989 | Thoman, Jr. |
| 4,886,241 A | * | 12/1989 | Davis et al. ................... 251/214 |
| 4,936,197 A | * | 6/1990 | Brent ............................... 92/168 |
| 5,078,175 A | * | 1/1992 | Martin et al. ................. 137/242 |
| 5,131,666 A | | 7/1992 | Hutchens |
| 5,230,498 A | | 7/1993 | Wood et al. |
| 5,263,682 A | * | 11/1993 | Covert et al. ................. 251/214 |
| 5,454,547 A | * | 10/1995 | Brown .......................... 251/214 |
| 5,593,166 A | | 1/1997 | Lovell et al. |
| 5,743,288 A | * | 4/1998 | Mosman et al. ......... 137/315.28 |
| 5,788,216 A | | 8/1998 | Pittman et al. |
| 5,799,928 A | | 9/1998 | Siver |
| 5,823,540 A | | 10/1998 | Grabau et al. |
| 5,908,046 A | * | 6/1999 | Mosman ........................ 137/312 |
| 6,116,573 A | * | 9/2000 | Cornette et al. .............. 251/214 |
| 6,866,244 B2 | | 3/2005 | Wears |
| 6,953,182 B2 | | 10/2005 | Lovell et al. |
| 8,146,885 B2 | * | 4/2012 | Lin et al. ....................... 251/214 |
| 2004/0155217 A1 | | 8/2004 | Wears |
| 2005/0200081 A1 | * | 9/2005 | Stanton et al. ................ 277/510 |
| 2007/0040141 A1 | | 2/2007 | Mahncke et al. |

FOREIGN PATENT DOCUMENTS

| | | |
|---|---|---|
| EP | 0 308 390 A1 | 3/1989 |
| EP | 0 483 097 A1 | 4/1992 |
| EP | 0 494 064 A1 | 7/1992 |
| WO | WO-95/23935 A1 | 9/1995 |

OTHER PUBLICATIONS

International Search Report and Written Opinion tor Application No. PCT/US2007/076619, dated Feb. 28, 2008.

Extended European Search Report for European Patent Application No. 11179845.0, dated Dec. 1, 2011.

* cited by examiner

LOW FRICTION LIVE-LOADED PACKING

CROSS-REFERENCE TO RELATED APPLICATIONS

This is a divisional of U.S. patent application Ser. No. 11/841,423, filed Aug. 20, 2007, which claims the benefit of priority of U.S. Provisional Patent Application No. 60/840,369, filed Aug. 25, 2006, the entire contents of which are hereby expressly incorporated herein by reference.

FIELD OF THE INVENTION disclosure relates generally to packing for valves, and more particularly, to an improvement of live-loaded packing for control valves used in process control applications that require very low emission levels from valve packing.

BACKGROUND OF THE INVENTION

In the process control industry, it is known that many process applications require control valves that leak very small amounts of a process fluid into the surrounding environment. In fact, some process plants are subject to federal regulation under the 1990 Amendments to the Clean Air Act which regulates the amount of certain process emissions, such as aromatic or chlorinated hydrocarbons, based upon measured emission concentrations (e.g., less than 500 parts per million by volume (ppmv)) that leak from control valve assemblies into the plant environment. Typical solutions to reduce such emissions include placing a bellows seal around the control valve stem to contain the emissions or installing spring-loaded or live-loaded packing assemblies within the control valve body to maintain the emissions at acceptable concentration levels during valve operation.

Typical bellows seals create an external, "accordion-like" environmental seal by attaching a flexible metal chamber (i.e., a bellows) around an exposed portion of the valve stem. The bellows seals are intended to capture and contain process fluids within the bellows chamber, thereby preventing escape to the surrounding environment. To be functional, the bellows must remain flexible through a large operational temperature range and be resistant to various types of corrosion, which generally requires the use of special metals. Bellows are generally made from expensive alloys such as Inconel® from Special Metals Corporation of New Hartford, N.Y. or Hastelloy® C from Haynes International, Inc. of Kokomo, Ind. Both special metals significantly increase the cost of the bellows seal. Additionally, bellows seals are expensive to install as the bellows are generally seal-welded to the valve stem, gasket-sealed at the bonnet/valve joint and require an extended valve bonnet. The physical construction of the bellows and this installation method also places limits on the amount of rotation that can occur in the valve stem. In order to prevent damaging the weld or the seal, an anti-rotation device must often be installed to limit the amount of valve stem rotation during operation. Bellows seals are also designed for a specific length of travel to maximize bellows fatigue life. Applications producing travel greater than the designed length of travel may damage the bellows by extending the "folds" beyond the designed length causing premature cycle fatigue or cracking to occur. An alternative to capturing the leaking emissions in a bellows seal is to prevent the emissions from occurring using improVed control valve packing such as live-loaded packing.

Conventional live-loaded packing sets are installed within a packing bore of the control valve assembly to seal around the valve stem to substantially reduce emissions from the packing set during operation. It is generally understood that the packing must be axially loaded or stressed to force radial expansion of the packing components to affect a dynamic seal on a moving valve stem and a static seal in the packing bore where the packing components are in contact within the control valve body. As used in the present description, it should be understood by one of ordinary skill in the art that the term packing stress means an axial force from a loading device, such as a spring, or from process pressure acting on the packing set that is divided by the annular area of the packing. Furthermore, the packing assemblies described herein use V-ring sealing components (i.e., the cross-section of the packing is in the shape of a "V") designed to amplify the axial packing stress into a larger radial contact stress to promote sealing by concentrating the axial forces in radial directions. It is generally known that environmental, live-loaded packing assemblies have certain limitations. FIG. 1 graphically represents the various types of example packing stress relative to a process packing pressure, A, described in detail below. One skilled of ordinary skill in the art should appreciate that packing stresses below the process pressure, A, may generally result in process fluid leaks since the process pressure may overwhelm a seal formed by the packing stress.

One type of conventional live-loaded packing is termed automatic packing. A seal is provided by a single V-ring packing set that is axially loaded by a coil spring that exerts a relatively small packing stress on the packing rings such as Single PTFE packing available from Fisher Controls International LLC of St. Louis, Mo. One skilled in the art understands that this type of packing set uses a V-ring with a high axial force-to-radial force ratio. That is, the V-ring is constructed to provide high radial expansion under the relatively low spring rate of a coil spring for a given application. This type of automatic packing is typically rated for environmental service (e.g., <500 ppmv concentration) at a maximum pressure of 300 psi, as shown in FIG. 1 as axial packing stress B, and a maximum temperature of 200° F. These types of packing may be loaded from the inboard or pressure side of the control valve, but are generally only applicable to low pressure, environmental applications due to the coil spring loading.

Another type of packing is generally described as double V-ring packing. This packing assembly uses two low pressure V-ring packing sets similar to the single V-ring packing described above with the packing sets arranged as an upper and a lower seal component, but without any type of spring loaded device to exert the packing stress. The packing set is stressed under a static packing load to create the valve stem seal with a packing nut/packing follower assembly known to those skilled in the art. The shortcoming of is type of packing is that without a spring element to ensure an adequate level of packing stress over a large temperature range, the packing design cannot be rated for environmental service, and, as such, is not depicted in FIG. 1.

Yet another type of environmental packing is a double V-ring, live-loaded packing set commercially available as Enviro-Seal® PTFE packing from Fisher Controls International LLC of St. Louis, Mo. This type of packing set uses a high pressure V-ring (i.e. a low ratio of axial force-to-radial force) loaded by a high-spring rate loading device such as a Belleville spring. In comparison to coil spring loading, the Belleville springs have a much greater spring rate to provide a relatively large force or packing stress required to compress the double V-ring packing for high pressure applications. This type of packing is typically rated for environmental service at a maximum pressure of 750 psi and a maximum temperature of 450° F. One issue with this type of packing assembly relates to the uses of Belleville springs to load the packing. Although the Belleville springs provide the required packing stress, the travel or range of compression of the Belleville springs is quite low. This combination of high spring rate and low or small travel range results in the need for very precise initial adjustment of the Belleville spring preload and/or tightly held manufacturing tolerances to obtain the desired packing stress. That is, one of ordinary skill in the art should appreciate that the packing stress per unit travel or compression of the Belleville springs is relatively large. As such, normal manufacturing tolerances within the control valve assembly necessitate manual adjustment, which can be very difficult and time consuming (e.g., the Fisher Controls Design D2 dump valves uses three Belleville spring stacked in series, which require adjustment precision within ±0.0024 inches to achieve a packing stress within ±50 psi). Thus, if the packing stress is too high, high packing friction may result, which can reduce control valve performance and packing life.

Additionally, coil springs typically are not used with high pressure, double V-ring packing due to the fact that bonnet/packing box area is limited and the cross-sectional area of coil spring needed to develop the proper spring rate will be too large. Furthermore, this type of packing set is typically loaded from the outboard side (i.e. external or atmospheric side as compared to the inboard or pressure side) of the control valve providing a packing force that opposes a force produced by the process pressure. Because the Belleville spring force opposes the force produced by the process pressure, the spring forces are not additive to the packing stress; therefore, the initial packing stress required to create the environmental seal must be accounted for in the initial packing setup by increasing the initial packing stress, as shown as a packing stress C of FIG. 1, which is independent of the process pressure until the process pressure matches the packing stress. This overcompensation in the initial packing stress creates greater friction in the assembly, which may cause the control valve actuator to be oversized, thereby adding expense to the control valve and resulting in greater packing wear during operation.

Another commercially available packing suited for high-temperature, high-pressure environmental service is a graphite-based packing with integrated PTFE known as Enviro-Seal Graphite ULF from Fisher Controls International LLC of St. Louis, Mo. This type of packing set uses graphite-based packing rings for high temperature operation with small amounts of PTFE integrated in seal components to minimize friction. Belleville springs are used to supply the packing stress. Unlike the previous packing sets, the extremely high axial force-to-radial force ratio of the graphite-based seal rings requires very high spring rates to create the environmental seal. For this type of packing, the Belleville springs create a very large force from the opposite direction of a force generated by the process pressure resulting in a packing stress that can approximate 4500 psi (shown as constant packing stress D in FIG. 1). Similar to other types of Belleville spring-based packing assemblies, the travel of the Belleville springs is very low requiring very precise initial adjustments to control the packing stress. Although this type of packing is rated for environmental service at a maximum pressure of 1500 psi and a maximum temperature of 600° F., the friction levels produced by this packing arrangement may be substantially higher than PTFE packing at temperatures below 300° F. and may be unacceptable in certain types of applications (e.g., applications without control valve positioners).

Accordingly, it is desired to provide an improved live-loaded packing system with improved operating range of performance which can apply a uniform stress to the valve stem packing, such that the packing stress remains at a constant level above a process pressure during operation. It is also desired to provide a live-loaded packing system to reduce packing friction for improved control valve performance and reduced packing wear for improved maintenance.

SUMMARY OF THE INVENTION

In an example packing assembly, a seal assembly comprising a seal component to provide a fluid seal around a valve stem and an anti-extrusion component to substantially prevent extrusion of the seal component about the valve stem and a loading assembly to provide a predetermined packing stress upon the seal assembly to couple the packing stress between the loading means and the seal assembly. The packing assembly further includes a packing retainer adapted to receive at least one of the seal assembly and loading assembly and is configured to couple the seal assembly and loading assembly to the control valve assembly. The packing retainer further includes a shoulder to engage a packing box within the control valve assembly to control a loading assembly preload to provide a predetermined packing stress to substantially reduce the packing friction and packing wear in the control valve assembly.

In another example packing assembly, a cartridge packing assembly comprises a seal assembly having a seal component to provide a fluid seal around the valve stem and, at least, a first anti-extrusion component to substantially prevent extrusion of the seal member about the valve stem and a loading assembly having a loading means to provide a predetermined packing stress upon the seal assembly and a follower component to couple the loading means to the seal assembly. The packing assembly further comprises a packing retainer adapted to be disposed in a packing box of the control valve assembly to receive the seal assembly and the loading assembly and having a shoulder to engage the control valve assembly to control the preload of the loading assembly to provide a predetermined packing stress to substantially reduce the packing friction and packing wear in the control valve assembly. The example packing retainer further includes an adjustment means to modify the packing stress upon installation.

BRIEF DESCRIPTION OF THE DRAWINGS

The features of this invention which are believed to be novel are set forth with particularity in the appended claims. The invention may he best understood by reference to the following description taken in conjunction with the accompanying drawings wherein like reference numerals identify like elements in the several figures, in which:

DETAILED DESCRIPTION

The example packing assembly uses a stack of seal rings and anti-extrusion rings to provide a high-pressure fluid seal assembly around a control valve shaft. The seal assembly may be characterized as follows: 1) a loading assembly, such as a Belleville spring stack, that provides compliant packing stress with sufficient travel to provide improved adjustments in packing wherein the packing stress is exerted in the same direction as a fluid pressure exerted by the process fluid; 2) a packing retainer arranged to engage a control valve body or bonnet assembly to substantially eliminate the need to initially adjust the packing stress to overcome or offset the process pressure thereby providing an environmental seal with reduced friction and reduced packing set wear; 3) a seal assembly with anti-extrusion washers and rings that substantially reduces valve shaft and/or seal wear during operation; and 4) a cartridge seal assembly that substantially improves the repair or replacement of the packing assembly. The improved packing assembly provides a cost-effective means to provide packing stress that "tracks" the process pressure by providing a constant packing stress that is above a packing stress which results from a process pressure to allow the packing to operate at the lowest acceptable stress, thereby minimizing friction and maximizing packing life. Tracking the process pressure will be described in greater detail below.

Figure 2:
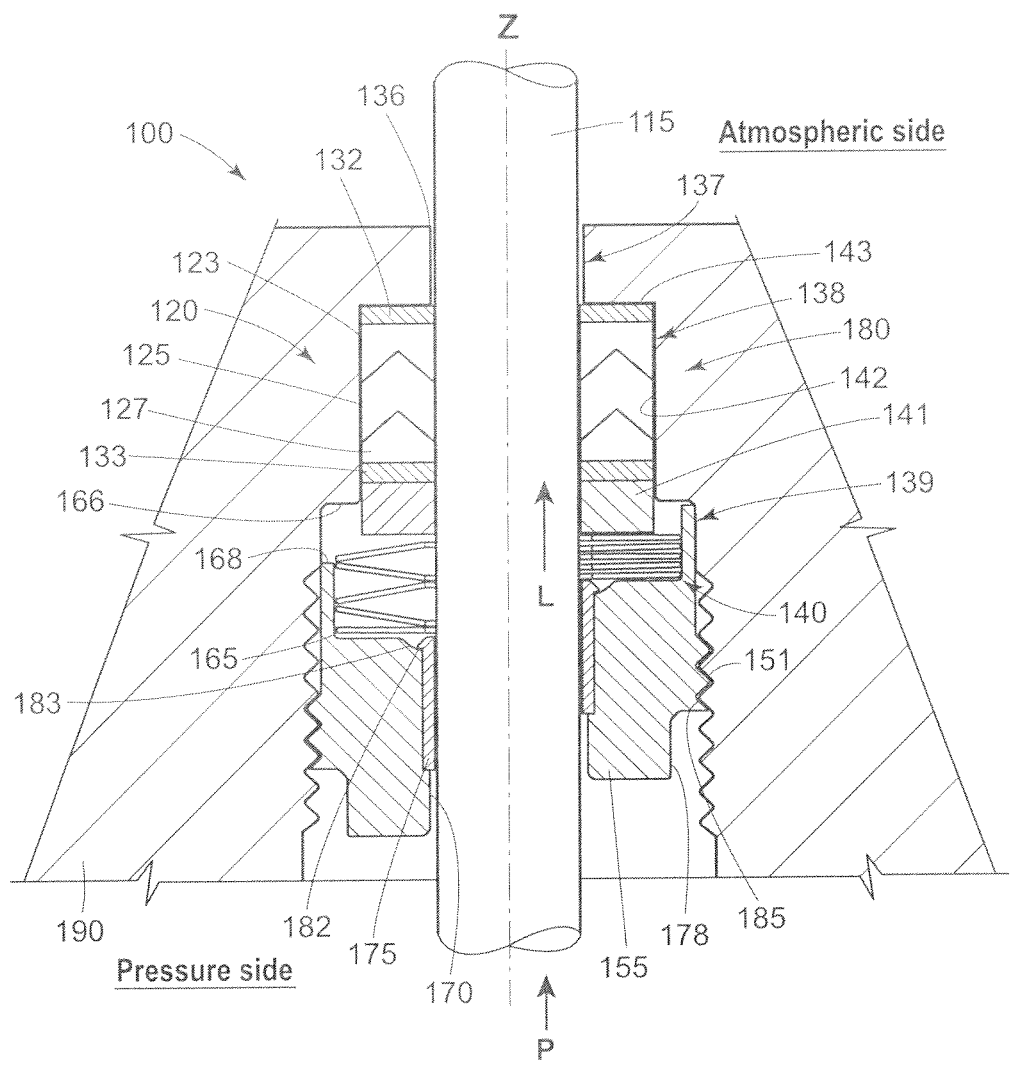
FIG. 2 is a split partial cross-sectional view of a live-loaded packing assembly in accordance with an example packing set.

In a first example packing assembly illustrated in FIG. 2, a split-partial, cross-section shows the packing assembly 100 unloaded or unstressed in the left half-plane, and loaded or stressed in the right half-plane. It should be understood by one of ordinary skill in the art that, by way of the example, the packing assembly described herein relative to a bonnet assembly 190; however, this description is not intended to limit the example packing assembly to such specific applications. For example, the example packing assembly could be installed directly into a packing box within a control valve or an actuator assembly without departing from the spirit and scope of the invention.

As previously described, many control valve applications require an environmental seal around a valve stem to prevent leaks of process fluid into the surrounding atmosphere. Additionally, many conventional packing sets are installed from the outboard side of the control valve (i.e., the top side or atmospheric pressure side external of the control valve body) and are generally loaded or stressed from the outboard side. This type of packing configuration is stressed by a force in opposition to the force generated by a process pressure that often results in initial packing stresses exceeding an amount required to create the environmental seal, which can degrade control valve performance, as described below.

In the present example, a packing assembly 100 to provide an environmental fluid seal is shown installed in a bonnet assembly 190 as an inboard-installed (i.e., installed relative to the inboard side or pressure side of the control valve body), bottom-loaded packing assembly. Specifically, the packing assembly 100 is positioned within a packing box 180 of the bonnet assembly 190 and receives a valve stem 115 via a throughbore 136 that extends through the packing assembly 100 and into the inboard side of the control valve which connects to a fluid control device (not shown) such as a valve plug to control the flow a fluid through the control valve. The packing box 180 of the bonnet assembly 190 is comprised of three substantially concentric bores 137, 138 and 139 to accommodate the valve stem 115 and the packing assembly 100. A first bore is an outer clearance bore 137 for the valve stem 115 to permit movement along an axial direction, Z, to couple the desired valve stem motion to the valve plug to control fluid flow within a valve. By providing a valve stem clearance contact is avoided to the valve stem 115, which may result in leaks by moving the damaged portion of the stem through the packing assembly 120. A second bore within the bonnet assembly 190 is a packing bore 138 provided to house a packing set 120 that provides the sealing mechanism of the packing assembly 100. The packing bore 138 is defined by a wall 142 that terminates in a packing bore shoulder 143 on the outboard side of the bonnet assembly 190 to provide a seating surface for the packing set 120. A third bore, relatively larger than the outer clearance bore 137 and the packing bore 138, is a retainer bore 139 configured to engage a packing retainer 155 to provide a pre-adjusted packing stress, as explained in greater detail below.

The packing set 120 is comprised of a single seal ring 125 and two anti-extrusion rings 123 and 127 commonly referred to as a V-ring type packing set. As shown in FIG. 2, the example packing set 120 includes an upper female adapter ring 123; a middle seal ring 125; and a lower male adapter ring 127 placed in intimate contact around the circumference of the valve stem 115. One skilled in the art can appreciate that various combinations of V-rings could also be used to achieve an environmental seal (e.g. five or seven V-ring sets). The V-ring type packing rings 123, 125 and 127 may be formed of polytetrafluoroethylene (PTFE), known as a V-type PTFE packing available from the John H. Crane Company of Morton Grove, Ill. Packing suitably formed of other material, or of other synthetic resin polymers, may also be used. Additionally, the adapter rings 123 and 127 may he carbon filled to provide greater rigidity under load which may create an improved seal, as described below.

The V-ring packing is preferred because under axial packing stress the V-shape cross-section inherently creates a radial load expanding the packing set to create an improved seal. In other words, under a load, the V-rings 123, 125 and 127 are axially compressed, which forces an associated radial expansion of the middle seal ring 125 both into the valve stem 115 and into the packing bore 138 as the mating V-shaped surfaces are driven into each other. Preferably, as each adapter ring 123 and 127 is relatively less compliant than the middle seal ring 125, thereby concentrating the packing stress in the middle ring to provide the fluid seal.

At elevated temperatures and/or elevated pressures, PTFE V-ring packing rings may extrude (i.e., distort from the original shape along a pathway such as the clearance bore 136 away from the seal ring 125) resulting in a loss of contained packing volume. The "translocation" of the packing may produce a subsequent loss of packing volume within the packing set yielding a reduction in associated packing stress, which may cause the packing to leak. To prevent such extrusion, the packing assembly uses two anti-extrusion washers 132 and 133 positioned on an outboard and inboard side of the packing set 120, as shown in FIG. 2. Both anti-extrusion washers 132 and 133 are characterized as generally non-compressible (e.g., the washers do not substantially compress in an axial direction nor expand in a radial direction) under the packing stress exerted to form the fluid seal.

Accordingly, the upper anti-extrusion washer 132 mates to the packing bore shoulder 143 to prevent extrusion through the clearance bore 136 on the outboard side of the valve body and the lower anti-extrusion washer 133 mates to a spacer 141 to prevent extrusion past the spacer 141 towards the inboard side of the valve stem 115. Both anti-extrusion rings also make contact with the packing bore wall 142 to contain the seal ring within the packing bore 138. One skilled in the art should also appreciate that the lower anti-extrusion washer 133 may be removed from the packing set 120 without substantially degrading anti-extrusion performance of the packing set 120. That is, it is believed that bottom-loading of the packing set, as described below, in addition to an outboard-directed force provided by the process pressure (shown as vector P in FIG. 2), may produce extrusion only to the outboard side of the bonnet assembly 190.

Each anti-extrusion washer is formed of a composition material, one of filled-PTFE having filler selected from at least one of the following: graphite, carbon, silica or of barium sulfate that is commercially available as Gylon® from Garlock Sealing Technologies of Palmyra, N.Y. The anti-extrusion washers are generally formed of a material that is sufficiently hard, relative to the packing rings, to prevent extrusion. It has been observed that a common anti-extrusion washer material, such the Gylong® 3510 material, may cause valve stem wear in certain high-cycle control valve applications (e.g., applications accumulating a large number of cycles such as 25,000 cycles).

Gylon 3510 is understood to be a composite material made from PTFE containing the mineral barium sulfate (i.e. substantially the mineral barite). In high-cycle applications, the barium sulfate may actually cause microscopic stem wear which can degrade packing performance. Barium sulfate is known to have a hardness of approximately 3 on the Mobs (HM) hardness scale, which is approximately 19 on the Rockwell C hardness scale (HRC). Valve stems are commonly made from S31600 which is known to have a hardness of approximately 25 HRC. It is believed that the mineral filler may have sufficient hardness to induce gradual wear or abrasion on the stem, which may cause packing degradation in operation. This may be because the anti-extrusion washers are substantially adjacent to the PTFE packing seal rings such that stem abrasion caused by the anti-extrusion washers will be positioned to make frequent contact with the PTFE packing ring during stroking of the valve, thereby causing roughened surfaces on the sealing portion of the stem. The abraded surfaces increase the wear rate of the packing seal rings which may produce undesirable leaks that require maintenance and repair.

Conversely, if this abrasion can be substantially decreased, the useful life of the packing assembly could be substantially increased. In the present example packing assembly, each anti-extrusion ring is preferably formed of a composite material of filled-PTFE having filler molybdenum disulfide and polyetheretherketone (PEEK) reinforcing polymer known as TCM® Ultra available from Fisher Controls International. Additional reference to the composite material may be made to the seal material described in U.S. Pat. No. 5,823,540, assigned to the present assignee, and hereby expressly incorporated by reference. The substantially less abrasive TCM Ultra filler material (i.e., molybdenum disulfide hardness is approximately 1 HM) is expected to increase the cycle life of example packing assembly and may also extend temperature range from approximately 450° F. to 500° F. Additionally, anti-extrusion rings made from TCM Ultra may be formed from a conventional molding process which is substantially less expensive than the die-cut stamping process used to make the typical Gylon 3510 parts.

As previously discussed, to form a fluid seal, the seal ring 125 must be radially expanded into the valve stem 115 and the packing bore 138. In the example packing assembly 100, the axial packing stress is transmitted through the substantially non-compressible spacer 141 from a loading assembly 140. The spacer 141 is generally made of S31600 and makes intimate contact with the wall 142 of the packing bore 138. A clearance bore is provided to receive the valve stem 115 without abrading the stem surface and to prolong packing life. The axial packing stress is generated from a loading force (shown as vector L in FIG. 2) b the loading assembly 140 of the example packing assembly 100. The loading assembly 140 is preferably comprised of a stack of Belleville springs, but one of ordinary skill in the art understands that other spring devices may be contemplated provided that the spring device can supply an appropriate amount of predetermined packing stress over the desired travel range. For example, a coil spring may be used, but the generally lower spring rate from a coil spring may require a significantly larger packing box volume to accommodate the assembly, which can increase control valve cost and create mounting and installation problems.

Unlike conventional Belleville springs, the loading assembly 140 of the example packing assembly 100 uses Belleville disk springs that have a relatively lower spring rate and longer travel or compression, as described in greater detail below. The loading assembly 140 is retained and compressed by a packing retainer 155 which is configured to be attached to the control valve body (not shown) from the inboard side. The packing retainer 155 is formed in a generally cylindrical shape having a substantially cylindrical cavity forming a loading assembly bore 165 for receiving the loading assembly 140 and second retainer bore 170 for receiving the valve stem 115 and/or a journal bearing 175. In certain applications, the journal bearing may provide guiding of the valve stem 115 through the packing assembly 100. To retain the journal bearing, the journal bearing 175 may include an engagement lip 182 formed to a engage a chamfered edge 183 of the packing retainer 155 and being held in position by compression of the Belleville springs of the loading assembly 140.

One such configuration to compress the loading assembly 140 is shown FIG. 2 of the example embodiment with external mating threads 185 that engage a corresponding thread 151 in a portion of the retainer bore 139. One skilled in the art should appreciate that other methods may be contemplated such as a clamped in design. Alternatively, in applications where valve stem guiding is not required, the journal bearing may be removed and the valve stem 115 passes through the clearance bore 170 without making any contact, thereby preserving the surface finish of the valve stem 115. One skilled in the art should appreciate that the installation and retaining mechanism of the example packing assembly may significantly reduce the installation and adjustment of the packing assembly.

Conventional live-loaded packing assemblies generally have what is known as a tolerance stack-up issue. This occurs when the packing assembly components and the control valve body overwhelm the travel or compression of the Belleville spring stack such that the adjustments of the packing assembly pre-load must be precisely set, as previously explained. Generally, this requires an operator to install the packing set within the control valve body or bonnet assembly and subsequently tighten the packing until the adjustment "bottoms out" (i.e., there is no adjustment remaining). The operator must subsequently loosen the packing assembly adjustment mechanism a precise number of rotations, depending upon the application, to set the packing at the desired stress level.

To avoid this issue, the example retainer 155 includes a retainer shoulder 168 as shown that contacts a retainer bore mating surface 166 when the retainer 155 is threaded into the retainer bore 139 of the bonnet assembly 190 to pre-set the packing stress. That is, the retaining shoulder 168 and the sizing of the loading assembly bore 165 are predetermined to precisely pre-load the packing assembly 120 when the retainer 155 is tightly threaded in to the bonnet assembly 190. For example, in the present example packing assembly 100 uses controlled dimensions to set the stress and five longer travel Belleville springs to increase the manufacturing tolerance stack-can be up to ±0.015 inches. Additionally the packing retainer 155 may have an external surface 178 formed to accept a standard socket, such as a hexagonal cross-section, to provide a convenient method to tighten the retainer 155 into the bonnet assembly 190.

It should be appreciated by one of ordinary skill in the art that the lower spring rates may be derived from the thinner Belleville disk springs. Thus, even though the Belleville springs have a relatively lower spring rate when compared to conventional packing assemblies, the longer travel range in combination with the lower spring rate provides adequate packing stress under a predetermined compression or load to provide an environmental seal with minimal friction. For example, in the present bottom-loaded packing assembly 100, a Belleville spring stack that can supply a packing stress of approximately 450 psi may result in an environmental seal in a valve such as the Fisher Controls Design D2. Thus, when the packing is tightened, the packing retainer bottoms out on a mating surface in the bonnet assembly creating the desired amount of initial packing stress. More significant, due to the bottom-loaded assembly, as the process pressure increases, the packing stress of the example bottom-loaded packing stays above the process pressure by an amount equal to the initial packing stress (i.e., the loading assembly force is not in opposition to the force created by the process pressure). With this design, the initial packing stress can be selected to give the desired performance characteristics for the application.

Figure 1:
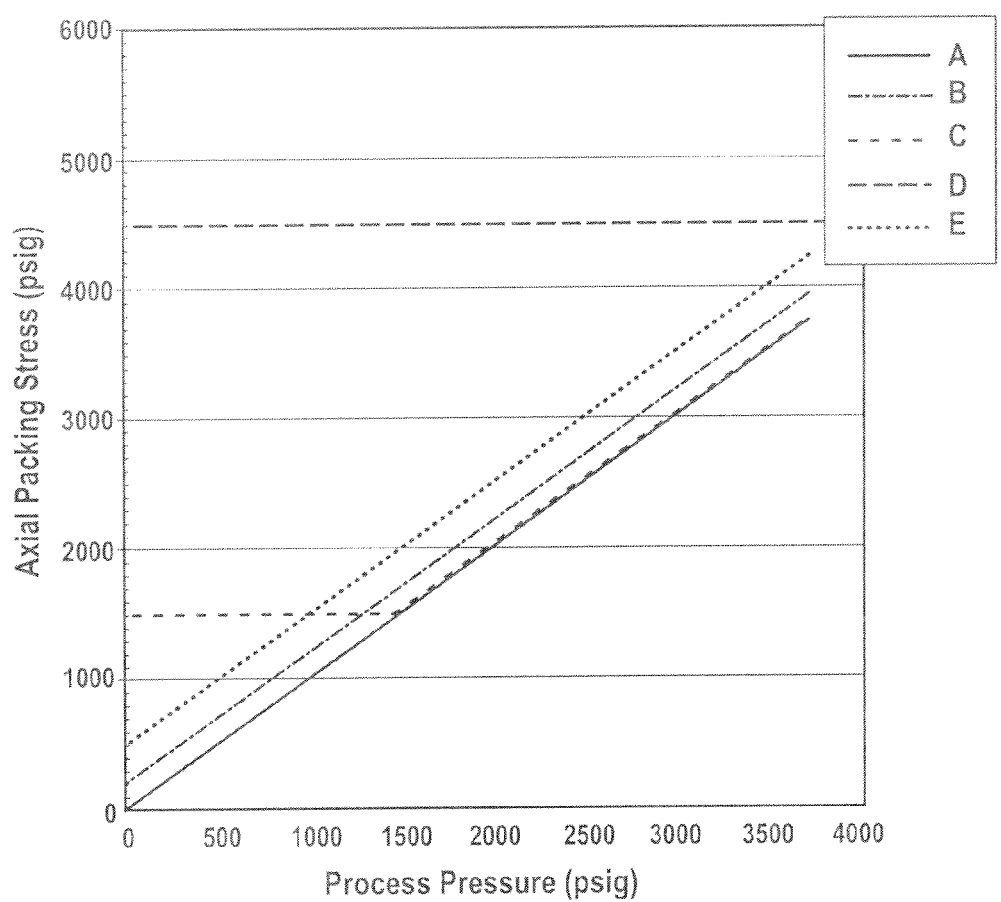
FIG. 1 is a graphical representation of the process pressure versus axial packing stress for various types of packing assemblies.

As an example, to create an environmental seal with the present example packing assembly that has 1500 psi packing stress under 750 psi process conditions only 750 psi of packing stress is required. This is a significant decrease in packing stress as compared to conventional double V-ring, live-loaded packing, 1500 psi packing stress, which may require an initial packing stress of 1500 psi. In other words, the bottom-loaded packing assembly 100 provides a packing stress that allows for a constant packing stress above the stress provided by the prevailing process conditions. That is, the packing stress of the example packing assembl "tracks" the process pressure with a packing stress-margin that is substantially equal to the initial packing stress and is constantly present such that the minimum packing stress will be substantially equal to the initial packing stress, as shown in FIG. 1 as packing stress E.

Alternatively, in process applications producing process pressures of 1000 psi, the example packing assembly 100 may use an initial packing stress of 500 psi to achieve a 1500 psi packing stress for an environmental seal. The lower packing stress of the example packing assembly 100 may reduce packing wear and packing friction to improve overall control valve performance and reduce maintenance expenses. It should be noted and appreciated by one of ordinary skill in the art that the example packing set will maintain an adequate environmental seal when operated in a vacuum service. That is, the initial packing stress can be set such that the under operating conditions drawing a vacuum (e.g., −14.7 psi) the pressure conditions are a relatively insubstantial percentage of the total packing stress exerted upon the packing assembly.

Figure 3:
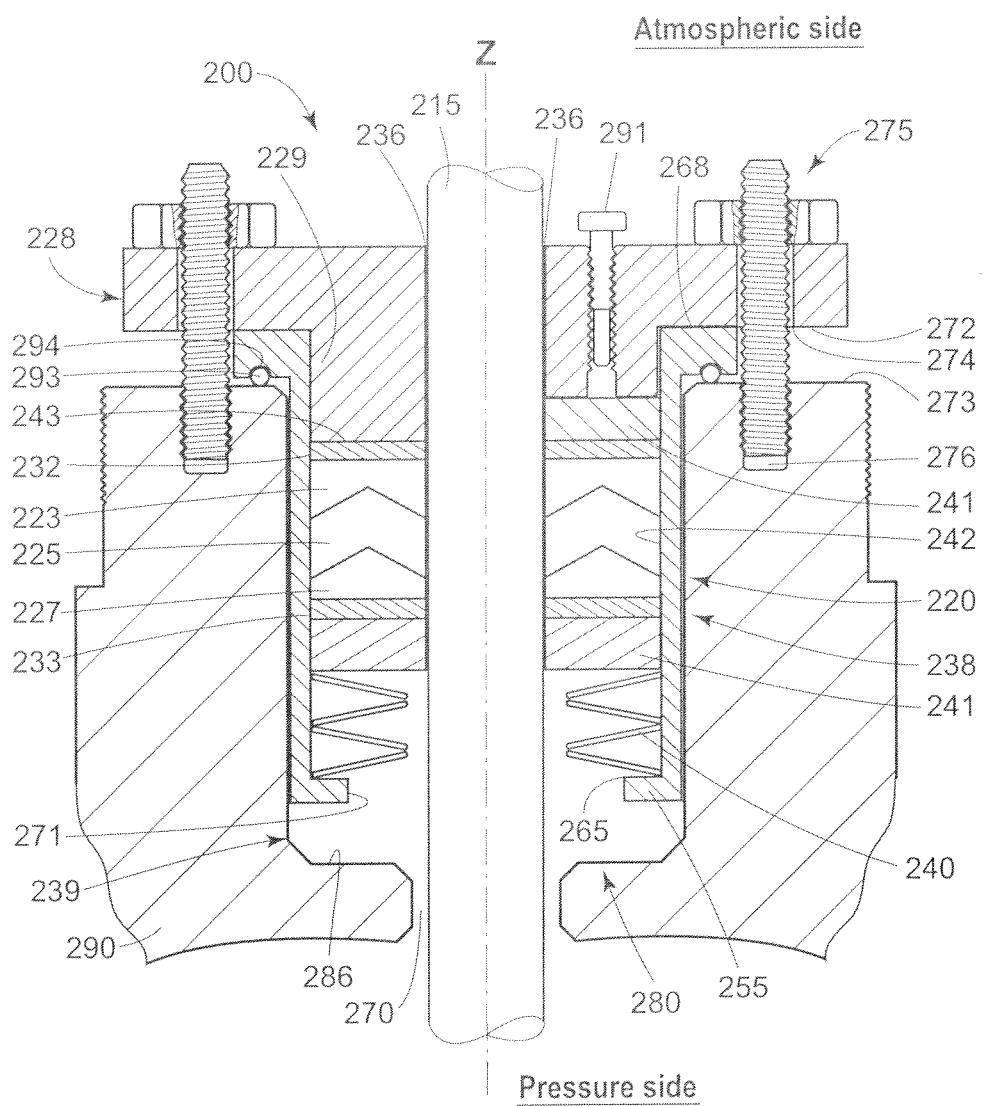
FIG. 3 is a split partial cross-sectional view of a live-loaded cartridge packing assembly in accordance with an example packing set.

An alternate example packing assembly is illustrated in FIG. 3. This type packing assembly may be installed in the body of a control valve, such as a conventional sliding stem globe valve, and may be defined as an outboard-installed, bottom-loaded packing assembly. That is, the packing assembly may be installed from the external side of the control valve and, as such, is suitable for either new installation or repair applications. Additionally, the split-partial cross-sectional view illustrated in FIG. 3 shows a non-adjustable cartridge packing assembly in the left-half plane and an adjustable cartridge packing assembly in the right-half plane. Similar elements have been given like reference numerals. The cartridge packing assembly 200 is similar to the previous example packing assembly in that it includes an assembly throughbore 236 that receives a valve stem 215 which connects to an inboard valve plug (not shown) to control fluid through the control valve.

The example cartridge packing assembly 200 is installed in a packing box 280 on the outboard side of a control valve body 290 and is comprised of two substantially concentric bores as shown. The first bore is a packing bore 238 which houses the cartridge packing assembly 200 and is comprised of inner wall 239 terminating in a chamfered-edge shoulder 286 that generally separates the main fluid flow path (not shown) in the pressure side of the control valve from the packing bore 238. The second bore is a clearance bore 270 for the valve stem 215 to permit valve stem 215 to move along a longitudinal axis, Z, clearance between the valve stem and the walls of the second bore is provided to prevent stem abrasion. The cartridge packing assembly 200 is retained within the packing box 280 by a packing flange 228 having a generally T-shaped cross-section that provides a flange mating surface 272 to attach to the control valve on an upper surface 273.

In the non-adjustable cartridge packing assembly shown in the left-half plane of FIG. 3, the packing flange 228 includes a lower substantially cylindrical portion 229 and has a first bore 236 for placing the valve stem 215 therethrough as shown. A clearance hole is provided about the valve stem 215 to substantially eliminate stem abrasion from the packing flange 228. A packing retainer 255 is positioned within the packing box 280 and is adapted to receive the lower portion 229 of the packing flange 228 within a packing bore 242 to provide a controlled surface dimension. This surface dimension will be used to compress a packing set 220 to produce a predetermined packing stress and will be described in greater detail below. As shown, the packing flange 228 attaches to the control valve body 290 with fasteners 275 that pass through clearance holes 274 and engage an internal threaded portion 276 of the valve body 290. Other methods may be employed such as clamping methods know to those skilled in the art. The sealing components of the example cartridge packing assembly 200 are similar to the previously described inboard-installed packing assembly.

As shown in FIG. 3, the packing set 220 is comprised of a single seal ring 225 and two anti-extrusion rings 223 and 227. The materials of construction are substantially similar to those previously described for like components. Additionally, to prevent extrusion, the packing assembly 220 also uses two anti-extrusion washers 232 and 233 positioned on an outboard and inboard side of the packing set 220, as shown in FIG. 3. As previously discussed, to form a fluid seal the seal ring 225 must be radially expanded into the valve stem 215 and the packing bore 238. In the example packing assembly 200, an axial loading force is transmitted through the substantially non-compressible spacer 241 from a loading assembly 240, preferably comprised of a stack of Belleville springs as previously described. One skilled in the art should appreciate that the present example packing assembly 200 may also include a journal bearing (not shown) a guide sleeve disposed in the clearance bore 270 to substantially reduce the effects of any side loads exerted by turbulent process fluids or actuator misalignment.

For the non-adjustable arrangement shown on the left-half plane of FIG. 3, it should be understood by one of ordinary skill in the art, that a pre-determined packing stress is established by a controlled distance between a top surface of a retainer shoulder 268 and a seating surface 265 for the loading assembly 240 and the length of cylinder portion 229 of the flange 228 with respect to the flange mating surface 272. As previously explained, conventional live-loaded packing assemblies generally have a tolerance stack-up within the control valve assembly components that can overwhelm the travel or compression of the Belleville spring stack.

Quite the opposite, the example packing set 200 provides a tolerance stack-up with respect to only two controlled dimensions. As such, the controlled distance between the retainer shoulder 268; the seat surface 265; and the cylindrical portion 229 of the flange 228 ensures accurate Belleville spring load. In other words, the load is determined by controlling the packing box depth within the sleeve rather than the depth of the original valve bore. Further, the example packing assembly 200 in the left-half plane substantially improves the repair or reconditioning process for existing valves by returning the packing box bore to new condition by "sleeving" the old bore with the new retainer 255. The new retainer 255 may provide improved corrosion resistance being made from a corrosion resistance metal or alloy such as S31600 or similar corrosion resistant, thermally stable polymers including PEEK. In fact, the packing retainer 255 may be used in a packing box 280 wherein the packing box may be over-bored or otherwised damaged by using a seal component such as an o-ring 293 or the like, positioned within an annual recess 294, to effectively seal between the packing retainer 255 and the packing bore 238. Alternatively, the split-partial cross-section view illustrated in right-half plane of FIG. 3 shows an adjustable cartridge packing assembly in the right-half plane as described below. That is, in certain applications, adjustments of the packing stress may be desirable (e.g., worn packing sets that require additional packing stress to ensure an environmental seal).

By accurately controlling the Belleville spring compression, and thereby accurately controlling the packing stress, packing performance can be significantly improved and variability can be significantly reduced compared to traditional externally adjusted packing. However, based upon the initial installation, after the packing has reached the end of its useful life, there is also the need to address packing leaks caused by worn packing. Typically, the packing must be tightened to stop packing leakage until maintenance can be scheduled to replace the packing set. This can be accomplished by a non-sealed adjustment screw 291 that engages with the retainer 255 to move the packing set 220 along an axial direction. It should be appreciated by one of ordinary skill in the art that the adjustment screw 291 does not need to be sealed because the adjustment means is external to the fluid seal created by the packing assembly 220. The adjustment screw 291 an additional mechanism to set the packing stress to a desired stress greater than that determined by the pre-determined length of engagement of the lower cylinder portion 229 of the packing flange 228, similar to the non-adjustable packing assembly previously described. That is, a supplemental spacer 241 positioned on the outboard side of the packing set 220 may be driven towards the packing set 220 to further compress the sealing ring 225 and increase the packing stress.

Additionally, one of ordinary skill in the art may also appreciate that an annular spanner ring (not shown) could also he used to adjust and set a packing stress. One should also appreciate that the adjustment screw can be designed to travel more than the Belleville springs, giving maintenance personnel the ability to apply very high packing stress if required. For example, such stress may be necessary to sufficiently reduce the leakage of severely worn packing.

Figure 4:
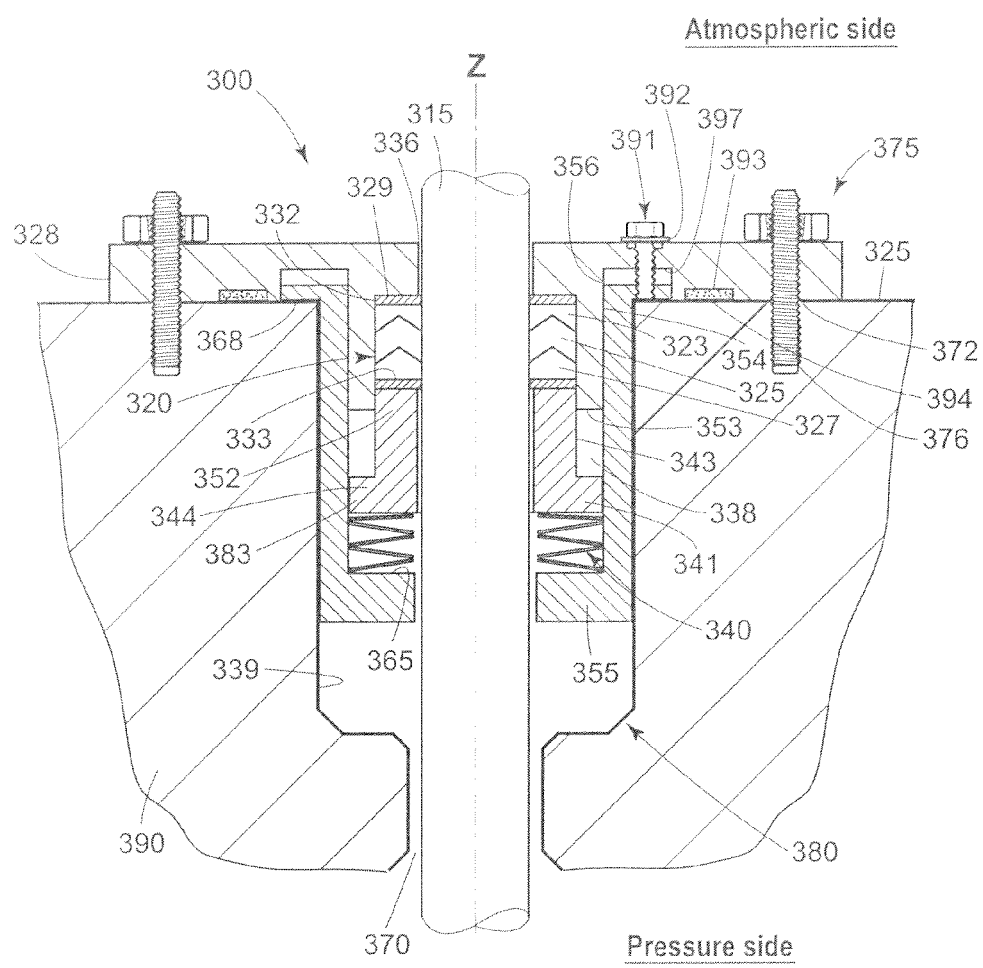
FIG. 4 is a split partial cross-sectional view of a live-loaded cartridge packing assembly in accordance with an example packing set.

An alternate example cartridge packing assembly is illustrated in FIG. 4. This type cartridge packing assembly may be also installed in the body of a control valve, such as a conventional sliding stem globe valve, and may be described as an outboard-installed, bottom-loaded packing assembly. The cartridge packing assembly 300 is similar to the previous example packing assembly in that it facilitates repair of existing control valves and provides an alternate means of adjustment. In this embodiment, the packing stress is applied from in the same direction as the process pressure, as previously described. The example cartridge packing assembly 300 is installed in an outboard packing box 380 of a control valve body 390. The cartridge packing assembly 300 comprises a packing flange 328 and a retainer 355 which form a cartridge packing box 383 consisting of two substantially concentric bores 352 and 338. The first bore is a packing bore 352 formed within the packing flange 328 and is comprised of outer wall 354 terminating in a shoulder 353. The second bore is a retainer bore 338 adapted to receive the outer wall 354 of the packing flange 328. The cartridge packing box 383 forms a contained volume to house a packing set 320, a stepped spacer 341 and a loading assembly 340, as described below. It should be appreciated by one of ordinary skill in the art that the stepped spacer 341 performs substantially the same function in this present example set as previously described. That is, the stepped spacer 341 transmits the packing stress from the loading assembly 340 via support of a retainer assembly 355.

Similar to the previous example packing assembly, the cartridge packing assembly 300, the retainer bore 338 terminates in a shoulder 365 to support the loading assembly and couple the loading assembly force to the packing set 320. The packing set 320 and the retainer 355 are retained within the control valve body 390 by the packing flange 328 in a manner previously described with fasteners 375 that pass through clearance holes 372 and engage an internal threaded portion 376 of the valve body 390. The packing flange 328 also includes an annular recess 393 and a flat sheet gasket 394 or similar sealing device to create a flange seal to prevent high pressure leaks past the cartridge packing assembly 320. The present example may be used as a non-adjustable arrangement shown when the pre-determined packing stress is based upon a loading force limitation defined by a controlled distance between a retainer shoulder 368 that contacts the upper surface of the valve body 325; a seating surface 365 for the loading assembly 340; and an insertion depth of a cylindrical portion 329 of the packing flange 328 with respect to the upper surface of the valve body 325. The packing flange 328 may also provide an adjustment means to provide additional packing stress in certain new or repair, as described in detail below.

The sealing components of the example cartridge packing assembly 320 are similar to the previously described inboard-installed packing assembly. That is, the packing set 320 is comprised of a single seal ring 325 and two anti-extrusion rings 323 and 327. The materials of construction and function of these components are substantially similar to those previous described for like components in the prior example packing sets. The packing assembly 320 also uses two anti-extrusion washers 332 and 333 positioned on an outboard and inboard side of the packing set 320, as shown in FIG. 4.

The retainer 355 of the cartridge packing assembly 300 is formed of a generally cylindrical shape having two concentric retainer bores. As illustrated in FIG. 4, the retainer bore 338 is adapted to receive a portion of the packing flange 328, the loading assembly 340, and a portion of the stepped spacer 341. A second bore 370 is adapted to receive the valve stem 315 and generally provide a clearance bore to receive the valve stem 315 that will not abrade the surface of the valve stem 315 which may cause packing degrading and fluid leaks. One skilled in the art should appreciate that the present example packing assembly 300 may also include a journal bearing (not shown) as a guide sleeve, similar to the previous example packing assembly to substantially reduce the effects of any side loads exerted by turbulent process fluids or actuator misalignment.

The example cartridge packing assembly 320 of FIG. 4 also includes an adjustment means to control the Belleville spring pre-load or packing stress within the packing assembly 320. As shown in FIG. 3, a sealed adjustment screw 391 is operatively coupled to the retainer 355 to move the retainer 355 along an axial direction towards/away from the outboard side of the control valve body 390. It should be appreciated by one of ordinary skill in the art that the adjustment screw 391 may be sealed by various methods such as an o-ring 392 or the like, as shown in FIG. 3. In the present example cartridge packing assembly 300, the adjustment of the packing stress results from rotating the adjustment screw 391 in a clockwise or counterclockwise direction depending upon whether the packing stress is to be increased or decreased. That is, the retainer 355 may be drawn towards the outboard side of the control valve body 390 to further compress the loading assembly to increase the packing stress, as desired. The example packing assembly 300 also includes an adjustment limiter.

The retainer 355 can travel towards the outboard side of the packing assembly until the upper surface 356 of the retainer assembly 355 contacts the limiter surface 397 of the flange 328. An alternate adjustment limiter may also be arranged within the stepped spacer 341. For example, an upper portion 343 of the stepped spacer 341 is configured to cooperate with the flange packing bore 352 such that the upper portion may be received within the flange packing bore 352 as the packing stress is adjusted. The stepped spacer 341 may be further configured such that a lower portion 344 may engage a packing bore shoulder 353 to limit the travel of the stepped spacer to ensure a minimum packing stress to provide an environmental seal, or may be indicative that the packing set 320 should be replaced if a sealed cannot be maintained.

While there have been shown and described what are at present considered the preferred embodiments of the present invention, it will be obvious to those skilled in the art that various changes and modifications may be made therein without departing from the scope of the invention as defined by the appended claims. For example, one skilled in the art should appreciate that the present embodiments may also be used with packing set that have non-V-ring style cross-sections such as die-formed ribbon packing or braided rope-style packing. Although certain apparatus, methods, and articles of manufacture have been described herein, the scope of coverage of this patent is not limited thereto. To the contrary, this patent covers all apparatus, methods, and articles of manufacture fairly falling within the scope of the appended claims either literally or under the doctrine of equivalents.

What is claimed is:

1. A cartridge packing assembly to seal a valve stem in a control valve assembly, the cartridge packing assembly comprising:
    a seal assembly having a seal component to provide a fluid seal around the valve stem and at least a first anti-extrusion component to substantially prevent extrusion of the seal member about the valve stem;
    a loading assembly having a loading means comprising at least one spring to provide a predetermined packing stress upon the seal assembly and at least one spacer to couple the at least one spring to the seal assembly; and
    a one-piece packing retainer adapted to be disposed in an outboard packing box of the control valve assembly, the packing retainer including a cylindrical sleeve portion defining a packing bore receiving the seal assembly and the loading assembly wherein the one-piece packing retainer includes a fixed length between a retainer shoulder and a loading means seating surface to control a loading assembly force that defines the predetermined packing stress in the control valve assembly, the loading means seating surface extending radially inward from the sleeve portion and the retainer shoulder extending radially outward from the sleeve portion for locating the packing retainer relative to the control valve assembly; and
    a bonnet defining the outboard packing box, wherein the packing retainer is removably disposed in the outboard packing box of the bonnet.

2. The cartridge packing assembly of claim 1, wherein the loading assembly force provides a substantially constant, packing stress supplemental to a process packing stress resulting from a process pressure within the control valve assembly.

3. The cartridge packing assembly of claim 1, wherein the packing retainer provides a corrosion resistant sleeve in the outboard packing box.

4. The cartridge packing assembly of claim 3, wherein the packing retainer is formed from a material selected from the group consisting of S31600, Inconel, Hastelloy, and PEEK.

5. The cartridge packing assembly of claim 1, wherein the seal component comprises at least a seal ring consisting of PTFE.

6. The cartridge packing assembly of claim 1, wherein the first anti-extrusion component comprises at least one of an anti-extrusion washer or an anti-extrusion v-ring.

7. The valve packing assembly of claim 6, wherein the anti-extrusion component comprises a material of filled-PTFE having a substantially non-abrasive filler.

8. The valve packing assembly of claim 7, wherein the substantially non-abrasive filler is molybdenum disulfide.

9. The valve packing assembly of claim 7, wherein the anti-extrusion component further comprises a reinforcing polymer of PEEK.

10. The valve packing assembly of claim 6, wherein the anti-extrusion component comprises a material of filled-PTFE having a filler selected from the group consisting of graphite, carbon, silica, and barium sulfate.

11. The cartridge packing assembly of claim 1, wherein the loading means comprises a stack of multiple Belleville washers.

12. The cartridge packing assembly of claim 1, wherein the packing retainer is retained within the control valve assembly by a flange component.

13. The cartridge packing assembly of claim 12, wherein the flange component further includes an adjusting means to modify the loading assembly force.

14. The cartridge packing assembly of claim 13, wherein the adjusting means is operatively coupled to the retainer.

15. The cartridge packing assembly of claim 13, wherein the adjusting means is operatively coupled to a second spacer.

16. The cartridge packing assembly of claim 1, wherein the packing retainer further comprises a journal bearing to guide the valve stem in the control valve assembly.

* * * * *

UNITED STATES PATENT AND TRADEMARK OFFICE
CERTIFICATE OF CORRECTION

| | | |
|---|---|---|
| PATENT NO. | : 8,622,367 B2 | Page 1 of 1 |
| APPLICATION NO. | : 13/106621 | |
| DATED | : January 7, 2014 | |
| INVENTOR(S) | : Michel Ken Lovell et al. | |

It is certified that error appears in the above-identified patent and that said Letters Patent is hereby corrected as shown below:

In the Specification:

At Column 1, line 7, "Aug. 20, 2007," should be -- Aug. 20, 2007, now pat. No. 7,963,502, --.

At Column 1, line 64, "improVed" should be -- improved --.

At Column 4, line 47, "may he" should be -- may be --.

At Column 6, lines 25, "may he" should be -- may be --.

At Column 7, lines 20, "the Mobs" should be -- the Mohs --.

At Column 7, lines 65, "b the loading" should be -- by the loading --.

At Column 9, line 36, "packing assembl" should be -- packing assembly --.

At Column 10, line 14, "valve stern 215" should be -- valve stem 215 --.

At Column 10, line 56, "a guide" should be -- as a guide --.

At Column 11, line 20, "otherwised" should be -- otherwise --.

At Column 11, line 57, "he used" should be -- be used --.

Signed and Sealed this
Twenty-third Day of June, 2015

Michelle K. Lee
*Director of the United States Patent and Trademark Office*